Figure 1:
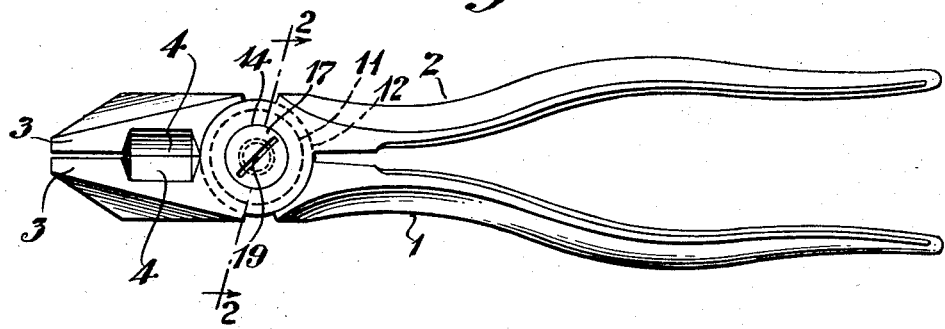

Nov. 1, 1932.  W. E. HOKE ET AL  1,886,271

PLIERS

Filed Dec. 26, 1930

INVENTORS
WILLIAM E. HOKE
ROBERT THOMSON
BY
ATTORNEYS

Patented Nov. 1, 1932

1,886,271

UNITED STATES PATENT OFFICE

WILLIAM E. HOKE, OF BALTIMORE, MARYLAND, AND ROBERT THOMSON, OF NEWARK, NEW JERSEY, ASSIGNORS TO DARDELET THREADLOCK CORPORATION, OF NEW YORK, N. Y., A CORPORATION OF DELAWARE

PLIERS

Application filed December 26, 1930. Serial No. 504,812.

Important objects of the present invention are, to provide a pivotal connection of improved design for tools such as pliers, shears, or the like; to provide such a pivotal connection designed to securely and accurately hold the pivoted parts in proper relation; to provide such a pivotal connection embodying a thoroughly reliable self-locking thread feature for maintaining the pivoted parts in proper relation; to provide a pivotal connection designed for quick and easy assembly of the parts, and quick and easy adjustment to take up wear; to provide a pivotal connection employing a self-locking thread feature enabling the pivoted parts to be easily and quickly connected, accurately adjusted to obtain the required degree of working play between the parts and serving to securely maintain said adjustment; to provide such a pivotal connection including a threaded trunnion of improved design and improved features of design in the pivoted members for cooperation with said trunnion; and to provide an extremely simple and compact pivotal connection of this character.

Figure 2:
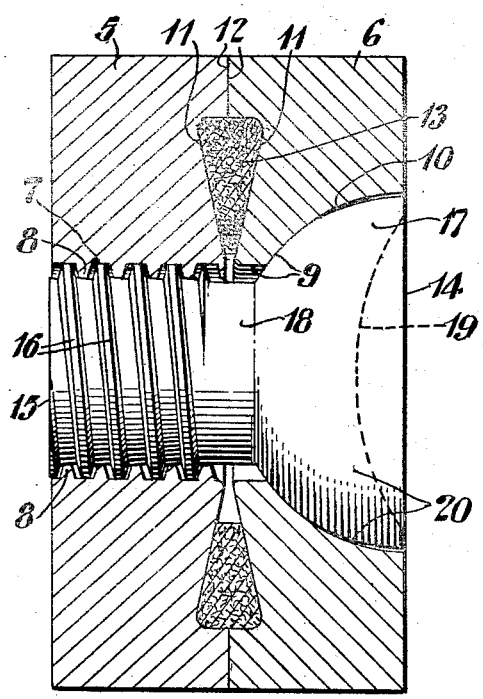
Figure 3:
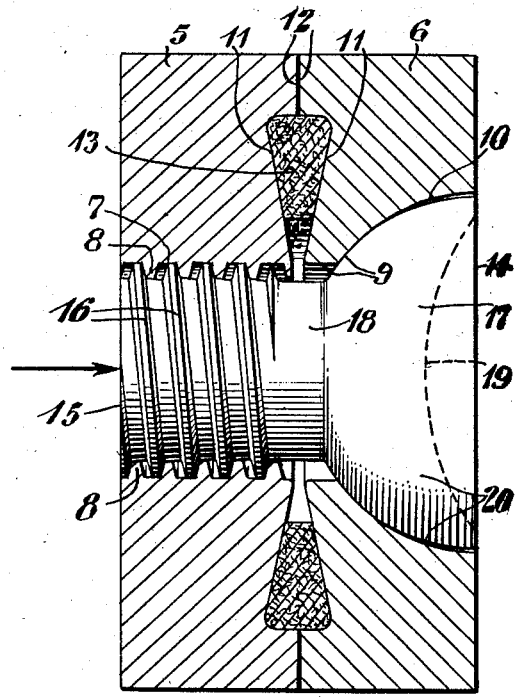

In the drawing:

Fig. 1 is a side view of a combined pliers and shears embodying our invention;

Fig. 2 an enlarged section taken on the line 2—2 of Fig. 1 showing a preliminary adjustment of the parts in the course of assembling them; and Fig. 3 a view similar to Fig. 2 showing the final working adjustment of the parts.

Our improved pivotal connection is shown as embodied in an electrician's tool designed to serve as a combined pliers and shears, or nippers. The pivotal connection may, however, be satisfactorily employed in a great variety of tools and mechanisms.

The tool shown is of approximately standard form. It comprises two pivoted members 1 and 2 formed at one end with opposed plier jaws 3 and formed, inwardly of said jaws, with opposed shearing or nipping blades 4. The medial portions of the members 1 and 2 are crossed for pivotal connection and extend beyond their intersection to form the usual handles. At their intersection the members 1 and 2 are formed respectively with flat, disk-like hub portions 5 and 6. These hubs are of material diameter and they are disposed face to face. Hub 5 is centrally formed with a pivot aperture 7 having a thread 8. The hub 6 is centrally formed with a pivot aperture 9 registering with aperture 7 and forming a substantially hemispherical concave surface 10. The latter forms a countersunk seat for a pivot or trunnion head. At its inner face each hub is formed with a shallow, circular recess 11 immediately surrounding its central aperture. Immediately outward of said recesses the inner faces of the hubs formed opposed flat, narrow bearing surfaces 12 surrounding the recesses and spaced radially a material distance from the pivot apertures. The bottoms of the recesses slope inward in opposite directions but are slightly out of contact around the pivot apertures. A felt oil-containing washer or gasket 13 is confined in the registering recesses.

For pivotally securing the hubs together there is a pivot screw or trunnion 14. The latter has a short shank 15 formed with an external thread 16 for engaging the internal thread 8 of hub 5, and with a head 17 separated from thread 16 by a short, slightly reduced neck 18. The head has a flat outer face, slotted as at 19, to receive a screw driver, a substantially hemispherical inner face 20 for rotatably seating in the concave seat 10. The curvature of the head surface 20 is made slightly greater than that of the seat 10 so that there will be a desired clearance and accommodation in the fitting of the head within the seat. Thereby, extreme nicety in the proportioning of the seat and the head may be avoided. Also, if the bearing surfaces 12 are not absolutely perpendicular to the pivot axis the head will accommodate itself in the seat 10 to the inaccuracy. The opposed curved surfaces of the head and seat are lapped or finished, as are also the surfaces 12, to give them a smooth finish and reduce friction to a minimum.

The threads 8 and 16 of the hub 5 and the trunnion shank 15 respectively are complementary threads of constant pitch, and as shown, are preferably the well known self-locking type of screw threads shown in Dardelet U. S. Patent No. 1,657,244. The crest of the thread 8 and the root of the thread 16 slope inward toward the trunnion head and make an angle of six degrees with the thread axis, this angle being within the angle of friction. The ribs of the threads are much narrower than the grooves so that the threads are relatively displaceable one across the other for self-locking engagement. When the threads are so locked the pivot screw is securely fixed to the hub 5 and its head forms a journal or trunnion for the hub 6.

The parts of the tool are assembled by placing the washer 13, saturated with oil, in one of the recesses 11 and bringing the members 1 and 2 together with the bearing surfaces 12 in contact. Then the pivot screw or trunnion 14 is inserted through the aperture 9 and screwed into the threaded aperture 7 until the head 17 bottoms in the concave seat 10, and the opposed bearing surfaces 12 are drawn firmly together. This stops axial advance of the screw through the aperture 7, and, upon further turning of the screw, its threads are displaced across the internal threads to bring the sloping crest and root surfaces into partial wedging self-locking engagement, as shown in Fig. 2. Then the exposed end of the pivot shank is tapped to drive the pivot screw axially in a reverse direction to that of its insertion. This completes the tight-holding wedging engagement of the threads and brings opposed faces thereof into abutment, as shown in Fig. 3. At the same time, said slight reverse axial movement of the screw serves to relieve the pressure upon the opposed bearing surfaces 12 and permit the pivoted members to pivot easily.

The design of the pivotal connection provides for quick and easy assembly, accurate working adjustment of the pivoted parts, positive maintenance of said adjustment, and ready readjustment to take up wear. It is also designed to work properly and reduce wear. The bearing surfaces 12 are kept lubricated by oil from the washer 13. Said surfaces are narrow and of desirably small area and are radially spaced a material distance from the pivot to increase their effectiveness in resisting stresses tending to relatively tilt the pivoted members. The engagement of the trunnion head in its concave seat is also of a character to obtain accurate fitting and reduction of wear. This engagement is also lubricated by oil from the washer 13. If objectionable play between the parts develops after long use and strain the play may be readily taken up by merely loosening the pivot screw and readjusting it to properly true the parts. The structure of the pivotal connection is extremely simple and compact and there are no projecting parts. The ends of the pivot screw are flush or substantially flush with the outer faces of the hubs.

Another desirable feature is the mounting of the oil-containing washer 13. The sloping bottom walls of the recesses 11 converge inward and hold the washer spaced outward away from the pivot. Thereby the washer is prevented from clogging the pivot and from applying too much oil thereto and is held for supplying oil at a proper rate to both the pivot and the bearing surfaces 12. The spherical form of the trunnion head and the seat 10 also contribute materially to prevention of strain and wear and to ease of operation. When there are lateral stresses tending to relatively tilt the pivoted members the hub 6 may tilt slightly about the spherical trunnion head without a binding effect.

What we claim is:

1. A tool of the character described comprising a pair of pivoted members having portions disposed face to face and having registering pivot apertures; a pivot in said apertures; opposed, contacting bearing surfaces on said opposed faces surrounding said apertures and radially spaced therefrom, said opposed faces having registering depressions extending between said bearing surfaces and the pivot apertures, with inwardly converging bottom walls and cooperating to form a recess tapering radially inward in cross section, surrounding the apertures and communicating with them therearound; and a lubricant-containing packing confined in said recess and held radially spaced from the pivot by said converging walls, for supplying lubricant to the pivot and to said bearing surfaces.

2. A tool of the character described, comprising a pair of pivoted members having opposed portions, one of said portions having a threaded aperture and the other having an aperture registering with said threaded aperture and forming a concave spherical seat at the outer face of the portion; and a pivot screw in said registering apertures having a shank formed with an external screw thread engaging the internal thread of the said threaded aperture, and a spherical head seated in said concave seat, said medial portion provided with the pivot head seat having clearance around the pivot shank spacing it out of contact with the shank, said engaged threads having clearance for crosswise relative displacement and having coacting locking surfaces sloping radially inward and toward the screw head, the screw being forced endwise in a reverse direction to that of its insertion and the said sloping thread surfaces being thereby jammed into self-locking engagement with each other, and the pivoted members having working clearance therebetween provided by said endwise forcing of the screw.

3. A tool of the character described, comprising a pair of pivoted members having opposed portions, one of said portions having a threaded aperture and the other having an aperture registering with said threaded aperture; and a pivot screw in said registering apertures having a shank formed with an external screw thread engaging the internal thread of the said threaded aperture, and a head holding together the pivoted members, said engaged threads having clearance for crosswise relative displacement and having coacting locking surfaces sloping radially inward and toward the screw head, the screw being forced endwise in a reverse direction to that of its insertion and the said sloping thread surfaces being thereby jammed into self-locking engagement with each other, and the pivoted members having working clearance therebetween provided by said endwise forcing of the screw.

4. A pivotal connection comprising a pair of pivoted members having opposed portions, one of said portions having a threaded aperture and the other having an aperture registering with said threaded aperture and forming a concave spherical seat at the outer face of the portion; and a pivot screw in said registering apertures having a shank formed with an external screw thread engaging the internal thread of the said threaded aperture, and a spherical head seated in said concave seat for universal relative rotation, said engaged threads having clearance for crosswise relative displacement and having coacting root and crest locking surfaces sloping radially inward and toward the screw head, and abrupt abutment side faces to positively limit crosswise dispacement, the screw being forced endwise in a reverse direction to that of its insertion and the said sloping thread surfaces being thereby jammed into self-locking engagement with each other, and the pivoted members having working clearance therebetween provided by said forcing of the screw.

5. A tool of the character described, comprising a pair of pivoted members having opposed portions, one of said portions having a threaded aperture and the other having an aperture registering with said threaded aperture and forming a concave spherical seat at the outer surface of the portion; and a pivot screw having a shank inserted through said registering apertures formed with an external thread engaging the internal thread of said threaded aperture, and a spherical head seated in said concave seat, the medial portion provided with said seat having clearance around the pivot shank spacing it out of contact with the shank.

6. A tool of the character described, comprising a pair of pivoted members having opposed portions, one of said portions having a threaded aperture and the other having an aperture registering with said threaded aperture and forming a concave spherical seat at the outer surface of the portion; and a pivot screw having a shank inserted through said registering apertures formed with an external thread engaging the internal thread of said threaded aperture, and a spherical head seated for relative rotation in said concave seat, said engaged threads being formed to coact for self-locking mutual engagement to lock the pivot in different axially adjusted positions relatively to the pivoted members.

In testimony whereof we hereunto affix our signatures.

WILLIAM E. HOKE.
ROBERT THOMSON.